United States Patent [19]

Marquier et al.

[11] Patent Number: 5,718,320
[45] Date of Patent: Feb. 17, 1998

[54] CANTILEVERED TWIN-CHAIN SKID-PLATFORM CONVEYER

[75] Inventors: Bernard Marquier, Paris; Bernard Debbia, Vernouillet, both of France

[73] Assignee: Air Industrie Systemes - A.I.S., Courbevoie, France

[21] Appl. No.: 650,856

[22] Filed: May 20, 1996

[30] Foreign Application Priority Data

May 23, 1995 [FR] France ................... 95 06126

[51] Int. Cl.⁶ .............................. B65G 21/22
[52] U.S. Cl. ..................... 198/345.3; 198/678.1
[58] Field of Search ................ 198/339.1, 343.2, 198/345.1, 345.3, 346.1, 346.3, 465.4, 678.1, 680, 685

[56] References Cited

U.S. PATENT DOCUMENTS

| | | |
|---|---|---|
| 4,049,500 | 9/1977 | Kamm ................... 198/345.3 |
| 4,598,812 | 7/1986 | Grube et al. ............. 198/345.3 |
| 4,723,356 | 2/1988 | Sakamoto et al. ......... 198/345.3 X |

FOREIGN PATENT DOCUMENTS

| | | |
|---|---|---|
| 0552711A1 | 7/1993 | European Pat. Off. . |
| 0581687A1 | 2/1994 | European Pat. Off. . |
| 1136535 | 5/1957 | France . |
| 2588837A1 | 4/1987 | France . |
| 2224252 | 5/1990 | United Kingdom . |

*Primary Examiner*—James R. Bidwell
*Attorney, Agent, or Firm*—Sughrue, Mion, Zinn, Macpeak & Seas, PLLC

[57] ABSTRACT

A conveyor for detachable skid platforms includes a conveying path defining a conveying direction, an endless drive transporter, and hangers associated with the endless drive transporter, and defining a suspension direction and a lateral direction that is perpendicular to the plane defined by the suspension direction and by the conveying direction, each of the hangers having a free end with a loading mechanism designed to co-operate with a complementary loading mechanism on a skid platform supporting an object to be conveyed. All of the hangers are associated with the endless drive transporter of a single overhead transporter.

14 Claims, 5 Drawing Sheets

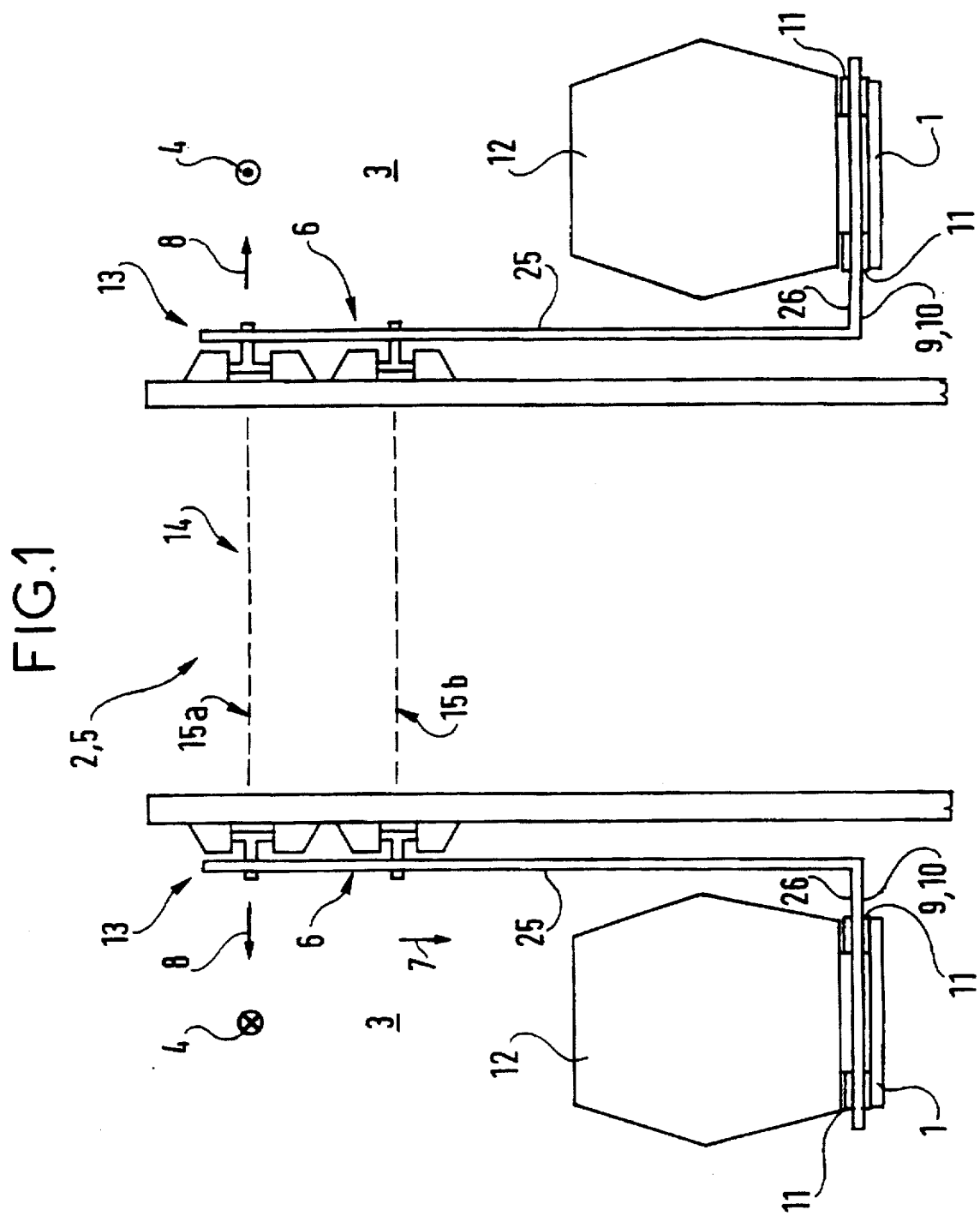

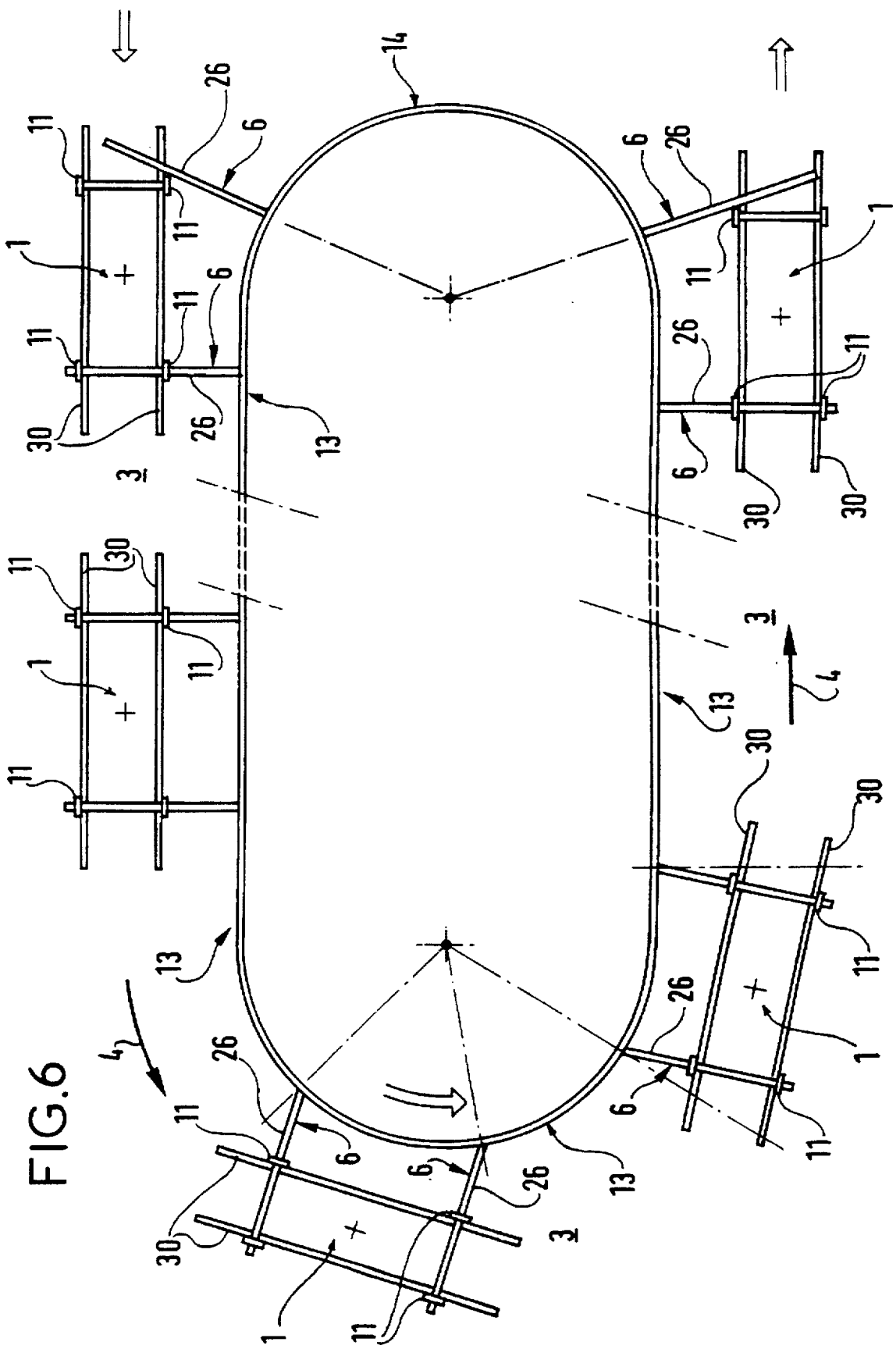

CANTILEVERED TWIN-CHAIN SKID-PLATFORM CONVEYER

BACKGROUND OF THE INVENTION

Skid-platform conveyors are known that comprise two overhead endless transporters disposed on either side of a conveying path defining a conveying direction.

The function of such conveyors is to load a skid platform supporting an object at the start of the conveying path, to transport the skid platform along the conveying path, and to unload the skid platform and the transported object at the end of the conveying path. Furthermore, such conveyors are endless, with the loading means returning via a return path to the start of the conveying path so as to load another skid platform.

The path may pass through various workshops for transforming the transported object. In particular, the conveying path may include at least one vessel containing a product for treating the transported object. For example, such vessels may contain paint or the like, with the transported object being a vehicle body.

Known conveyors such as those described in DE-A-3,024,195 include swing trays, each of which is associated with two overhead transporters. The swing trays carry the skid platforms, and the objects to be conveyed are disposed on the skid platforms.

That disposition makes it complex to load and unload the skid platforms, and because of the presence of the swing trays between the two overhead transporters, the return path must be disposed above or below the conveying path, which constitutes a space penalty.

Furthermore, when the path passes through a treatment vessel, the radius of curvature of the transition where the path changes level is large.

Since the swing trays are free to rotate about an axis perpendicular to the conveying direction, any sudden change in direction due to the change in level would give rise to longitudinal swinging of the swing trays and therefore of the skid platform and of the transported object.

In order to limit such swinging, the change in direction must be as gradual as possible, i.e. the radius of curvature of the change in direction must be large.

The drawback with this is that the conveying paths are made considerably longer.

Conveyors exist in which each transporter device has its own suspended means, each of which has a free end and includes loading means designed to co-operate with complementary loading means associated with the skid platform supporting an object to be conveyed.

Under normal conveyor operating conditions, the suspended means continuously follow a conveying go run on which they are associated with a skid platform, and an empty return run on which they are returned empty to the start of the conveying go run.

Such a conveyor is described in FR-A-2 588 837. In that document, each of the overhead conveyors is a monorail conveyor, the suspended means are pendular members associated with respective ones of the two monorails, and having hook-shaped free ends serving as means for loading the skid platform. The skid platform includes arms serving as complementary loading means. The pendular members are returned via an external side return run, thereby making it possible to save space.

Unfortunately, the conveyor as defined in FR-A-2 588 837 suffers in particular from the following drawbacks:

the lateral and longitudinal degrees of freedom of the pendular members cause the skid platforms to move or swing transversely or longitudinally relative to the overhead conveyors, and therefore, like the above-described other known conveyors, the radii of curvature must be large for the changes in direction at the changes in level;

special skid platforms are used that have larger overall dimensions than the transported objects due to the presence of the loading arms, thus requiring a conveying path that is wider than would otherwise be necessary.

Furthermore, such devices require a rectilinear conveying path because of the presence of the transporters on either side of said path. Furthermore, on such a rectilinear conveying path, only the run situated between the transporters can be used for conveying, since the external side return runs for the empty hangers cannot be used for conveying.

OBJECTS AND SUMMARY OF THE INVENTION

An object of the present invention is to provide a skid-platform conveyor that mitigates in particular the above-mentioned drawbacks.

To this end, the invention provides a conveyor for conveying skid platforms, the conveyor comprising a conveying path defining a conveying direction, endless drive means, and hangers associated with the endless drive means, and defining a suspension direction and a lateral direction that is perpendicular to the plane defined by the suspension direction and by the conveying direction, each of said hangers having a free end comprising loading means designed to co-operate with complementary loading means on a skid platform supporting an object to be conveyed.

According to the invention, all of the hangers are associated with the endless drive means of a single overhead transporter.

According to a characteristic of the invention, the endless drive means comprise at least two endless drive devices that are identical, parallel, and superposed in the suspension direction, and that are synchronized with each other, each hanger being driven by both of the two identical and superposed endless drive devices.

Each of the hangers is generally L-shaped, comprising an upright extending substantially in the suspension direction, and a loading prong extending substantially in the lateral direction towards the conveying path, the loading means of the hanger comprising said loading prong, and the complementary loading means on the skid platform comprising at least one receptacle for receiving the loading prong.

Each endless drive device comprises an endless chain or the like, a plurality of chain support elements driven by the endless chain or the like and mounted on a chain support and guide rail, and a plurality of lateral force take-up elements driven by the endless chain or the like and mounted in a guide and lateral force take-up rail, each of said hangers being driven via at least first and second guide and lateral force take-up elements belonging to respective ones of the endless drive devices.

According to a characteristic of the embodiment, each of the guide and lateral force take-up elements driving a hanger is secured directly to at least one support element.

The hangers are prevented from moving relative to the guide and lateral force take-up elements both in the lateral direction and in the conveying direction, and they are mounted to rotate about respective axes extending in the lateral direction relative to the guide and lateral force take-up elements with which they are associated.

Advantageously, at least some of the hangers are suspended from the guide and lateral force take-up elements of one of the two identical superposed endless drive devices only, and at least some of the other hangers are suspended from the guide and lateral force take-up elements of the other one of the two identical superposed endless drive devices only.

In a particular embodiment, the chain support elements are trolleys running on the guide and suspension rail, and they are mounted to move in translation with the chain or the like in the conveying direction.

The guide and lateral force take-up rail is a rail that is generally channel-section, each of the guide and lateral force take-up elements including two wheels having axes of rotation perpendicular to the web of the channel section, and disposed in the channel section, each of said wheels being mounted at a respective one of the ends of a longitudinal beam element, said beam element including centered association means for association with a hanger, each end of the beam element being secured directly to a trolley.

The centered association means for association with a hanger comprise a pin extending in the lateral direction and mounted substantially at the center of the beam element, the pin including a free end, said upright of each hanger extending in the suspension general direction, being suspended from and driven via the free end of the pin extending in the lateral direction of one of the guide and lateral force take-up elements of one of the two endless drive devices, and merely driven via the free end of the pin extending in the lateral direction of one of the guide and lateral force take-up elements of the other endless drive device.

The skid platform comprises two longitudinal runners interconnected by crosspieces, and at least four C-shaped receptacles, each of which is disposed substantially in the vicinity of a respective longitudinal end of a respective longitudinal runner, the receptacles disposed at the front of the skid platform having the openings of their C-shapes facing towards the front of the skid platform, the receptacles disposed at the rear of the skid platform having the openings of their C-shapes facing towards the rear of the skid platform, a hanger being spaced apart from the preceding hanger and from the following hanger by a distance substantially equal to the distance between the two receptacles on a longitudinal runner of the skid platform.

The loading means of the hanger, and the complementary loading means on the skid platform constitute a link pivoting about an axis extending in the lateral direction.

The loading means of the hanger and the complementary loading means of the skid platform constitute a link offering improved safety during the conveying run.

A first advantage of the present invention lies in the fact that the conveyor comprises a single overhead transporter. In addition to saving space, this means that it is possible for the conveying path to include curves in a plane perpendicular to the suspension direction. It is thus possible to implement closed circuits in which both the go run and the return run are used for conveying, with the empty return run being as short as possible. Furthermore, the single transporter is situated to one side of the conveying path and uses L-shaped hangers, thereby giving uncluttered access to the sledge and therefore to the conveyed object.

Another object of the present invention lies in the fact that the hanger is driven by both of the two superposed endless drive devices, thereby providing two points at which each of the hangers is associated with the overhead transporter, so that the hangers always remain mutually parallel, and so that the skid platforms are prevented from swinging longitudinally. The radii of curvature of the changes in direction at changes in level can thus be significantly reduced, thereby making it possible to reduce the length of the conveying path.

Another advantage of the present invention lies in the fact that the hangers are prevented from moving in the lateral direction, thereby preventing the skid platform from swinging laterally. This characteristic makes it possible to use L-shaped hangers by taking up the lateral forces generated by the cantilevered position of the skid platforms on the hangers.

BRIEF DESCRIPTION OF THE DRAWINGS

Other advantages and characteristics of the present invention appear from the following description given with reference to the accompanying drawings, in which:

FIG. 1 is a diagrammatic fragmentary cross-section view of a conveyor of the invention;

FIG. 6 is a diagrammatic view showing a skid platform loading stage, a curve stage, and a skid platform unloading stage in a conveyor of the invention.

MORE DETAILED DESCRIPTION

Figure 3:
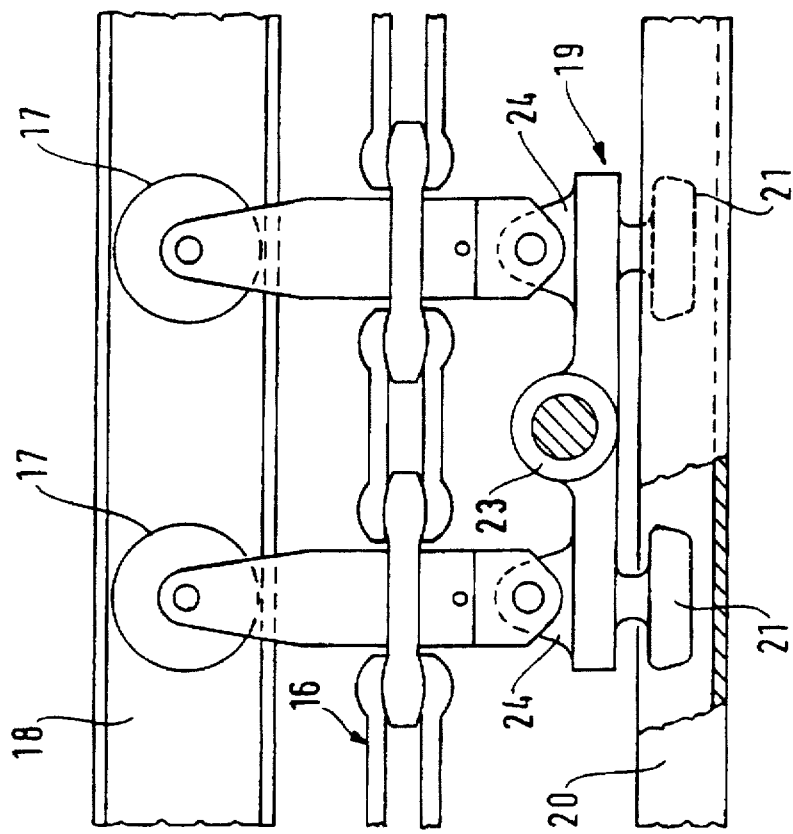
FIG. 3 is diagrammatic view looking in the lateral direction, showing an endless drive device that is part of a conveyor of the invention.
Figure 2:
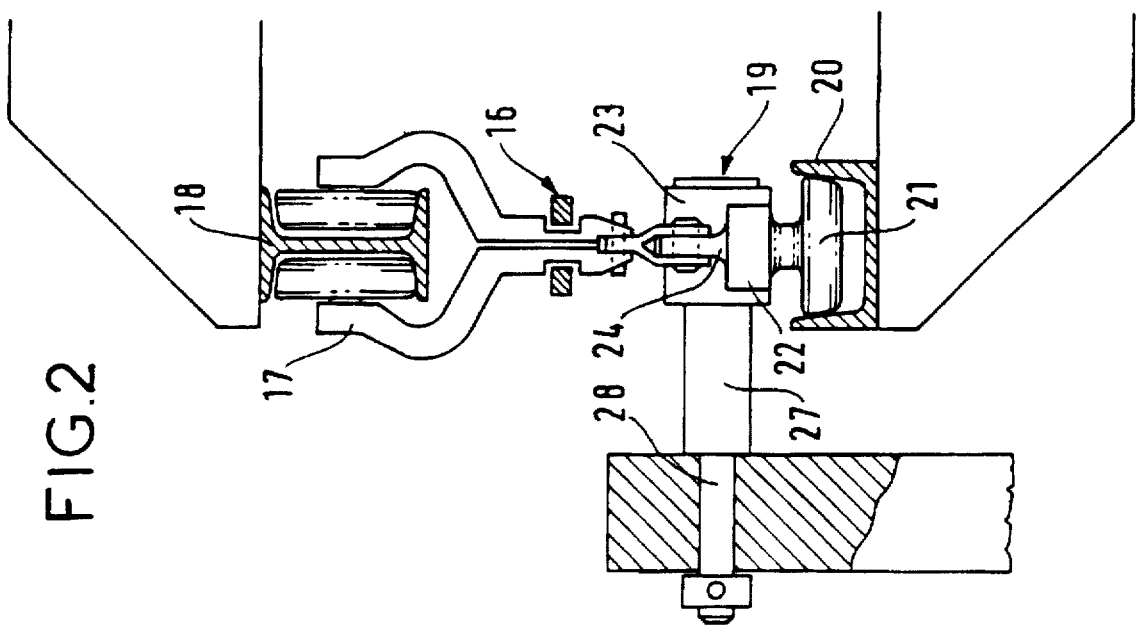
FIG. 2 is a diagrammatic view looking in the conveying direction, showing an endless drive device that is part of a conveyor of the invention.
Figure 4:
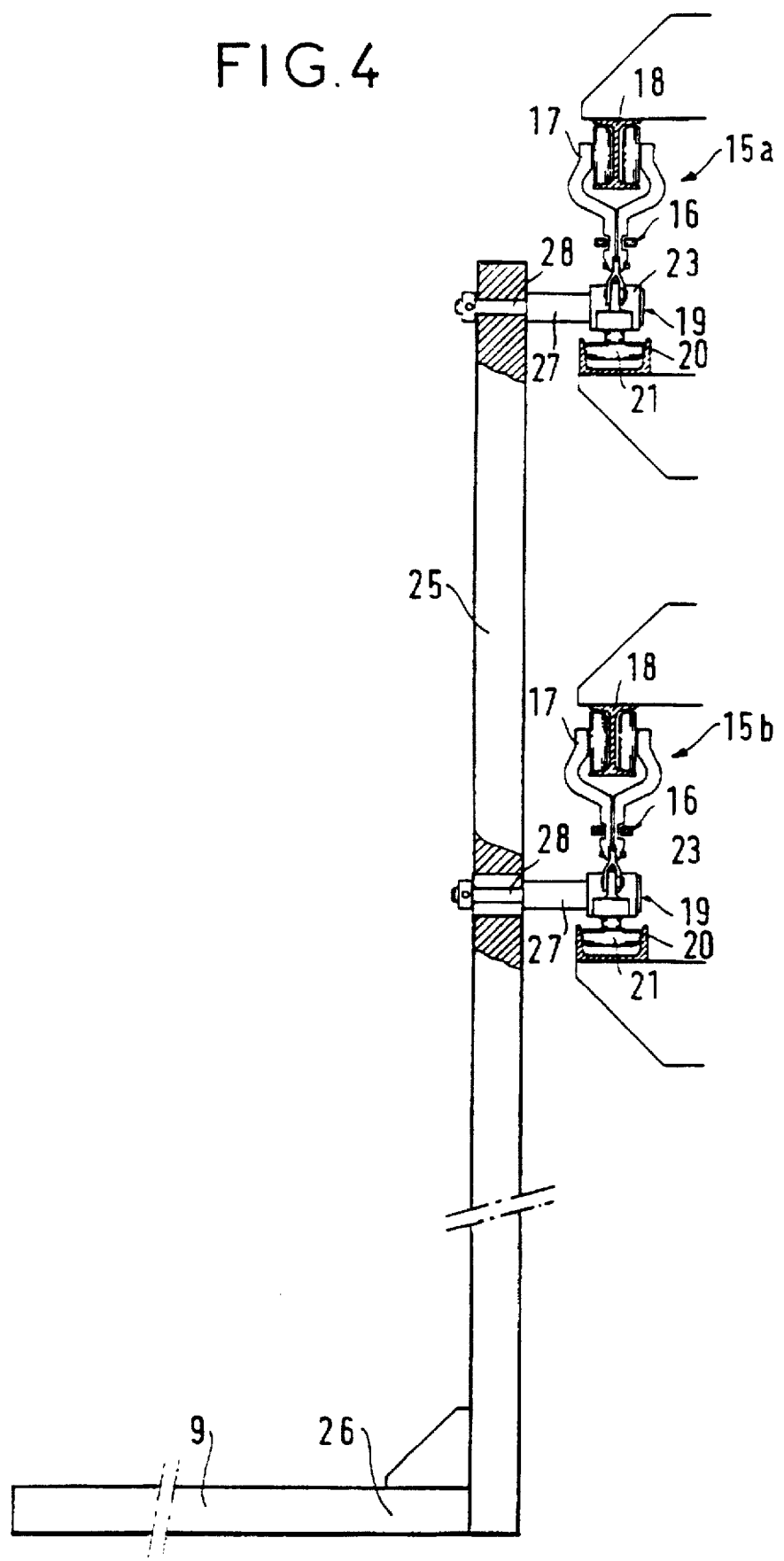
FIG. 4 is a diagrammatic view looking in the conveying direction, showing how a hanger is associated with the endless drive devices.
Figure 5:
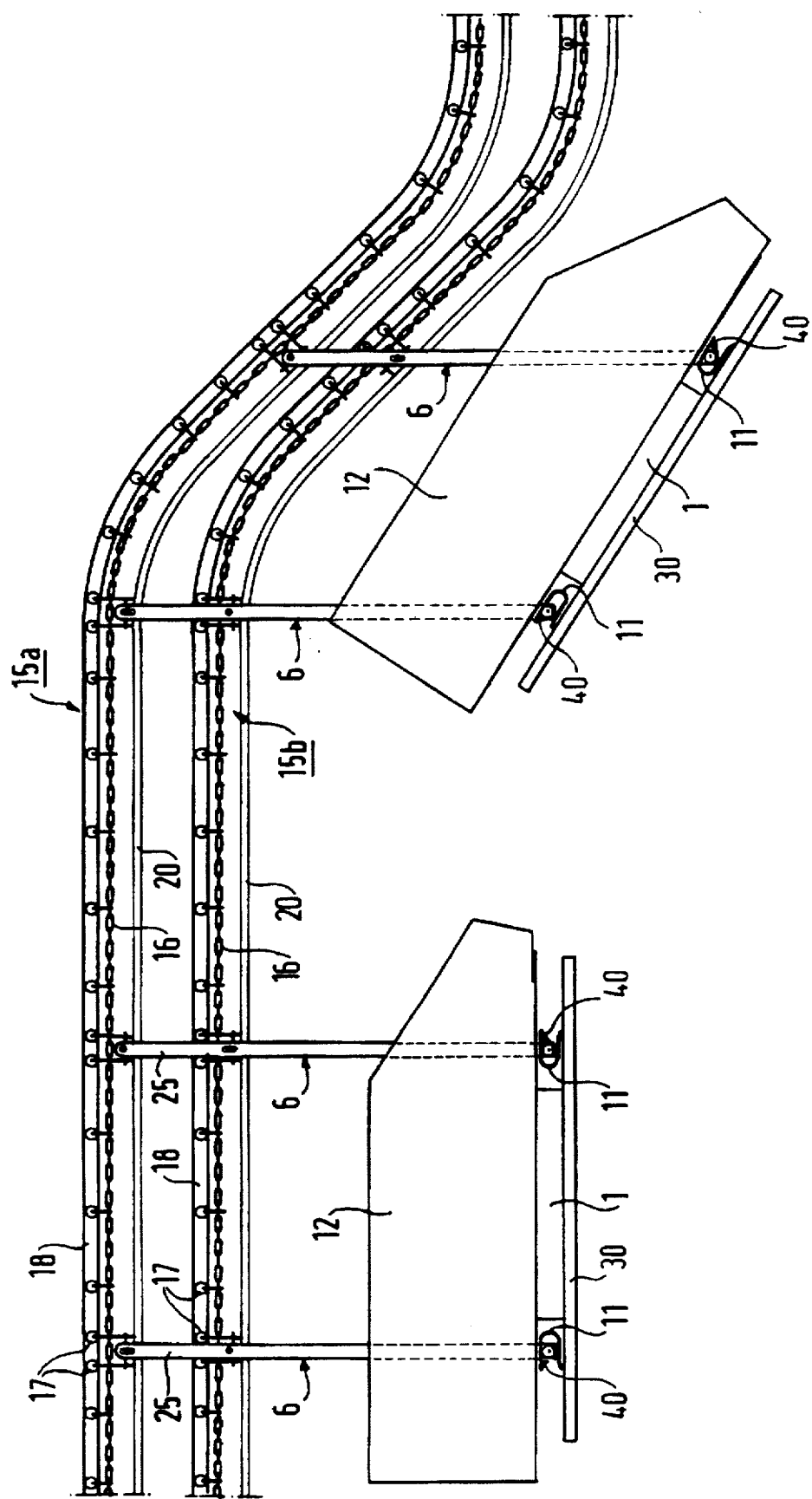
FIG. 5 is a diagrammatic view of a change of level in a conveyor of the invention.

The invention relates to a conveyor for conveying skid platforms 1. The conveyor comprises a single overhead transporter 2 disposed along a conveying path 3 defining a conveying direction 4.

The overhead transporter 2 comprises endless drive means 5 and hangers 6 associated with the endless drive means 5.

The hangers 6 define a (substantially vertical) suspension direction 7 corresponding to the direction in which the hangers hang under normal operating conditions, and a (substantially horizontal) lateral direction 8 that is perpendicular to the plane defined by the suspension direction 7 and by the conveying direction 4.

Each hanger 6 has a free end 9 comprising loading means 10 designed to co-operate with complementary loading means 11 on the skid platforms 1 supporting the objects to be conveyed 12.

The endless drive means 5 of each overhead transporter 2 comprise at least two endless drive device 15a, 15b that are identical, parallel, and superposed in the suspension direction 7. The endless drive devices 15a, 15b are synchronized with each other.

Each of the hangers 6 is substantially L-shaped, comprising an upright 25 extending substantially in the suspension direction 7 and associated with the two identical and superposed endless drive devices 15a, 15b, and a loading prong 26 extending substantially in the lateral direction 8 towards the conveying path 3.

The loading means 10 on the hanger 6 comprise the loading prong 26, and the complementary loading means 11 on the skid platform comprise at least one receptacle 11 for receiving the loading prong 26.

In order to prevent the hangers from swinging longitudinally, each hanger 6 on the overhead transporter 2 is driven by both of the two identical, superposed, and synchronized devices 15a, 15b.

Thus, each hanger 6 is driven at two drive points that are mutually synchronized and superposed, the hangers therefore remain mutually parallel in the suspension direction 7, and they are thus prevented from swinging longitudinally.

Each endless drive device 15a, 15b includes an endless chain 16 or the like, a plurality of chain support elements 17 driven by the chain 16 and mounted on a rail 18 for guiding and supporting the chain 16.

In order to counter the leverage created by the weight of the skid platform 1 bearing against the loading prong 26 of each of the hangers 6, each endless drive device 15a, 15b includes a plurality of lateral force take-up elements 19 driven by the endless chain 16 or the like, and mounted in a guide and lateral force take-up rail 20, each of said hangers being associated with both of the endless drive devices 15a and 15b respectively via at least first and second guide and lateral force take-up elements 19.

The hangers 6 are prevented from moving relative to the guide and lateral force take-up elements 19 both in the lateral direction 8 and in the conveying direction 4, and they are mounted to rotate about respective axes extending in the lateral direction 8 relative to the guide and lateral force take-up elements 19.

Advantageously, and in order to relieve the burden on the chain 16, each of the guide and lateral force take-up elements 19 driving a hanger 6 is secured directly to at least one support element 17.

In an embodiment of the invention shown in the figures, the chain support elements 17 are trolleys 17 running on the guide and suspension rail 18, and they move in translation with the chain 16 or the like in the conveying direction 4.

The guide and lateral force take-up rail 20 is a generally channel-section rail disposed so that the web of the channel section is perpendicular to the suspension direction 7.

Each guide and lateral force take-up element 19 includes two wheels 21 having axes of rotation perpendicular to the web of the channel section, and disposed in the channel section, each of said wheels 21 being mounted at a respective end 24 of a longitudinal beam element 22.

The beam element 22 includes centered association means 23 for association with a hanger 6, and each end 24 of the beam element 22 is secured directly to a respective trolley 17.

The centered association means 23 for association with a hanger 6 comprise a pin 27 extending in the lateral direction 8 and mounted substantially in the center of the beam element 22, the pin having a free end 28.

The upright 25 of each hanger 6, which upright extends in the suspension general direction 7, is associated with and driven via the free end 28 of the laterally-extending pin 27 of a guide and lateral force take-up element 19 of each endless drive device 15a, 15b.

Advantageously, so as to distribute the load over the two endless drive devices 15a, 15b, certain hangers 6 are suspended from one of the two endless drive devices 15a, 15b only, and are merely driven by the other endless drive device 15b, 15a.

For example, the upright is supported via the free end 28 of a pin 27 of a guide and lateral force take-up element 19 of one of the endless drive devices 15a, 15b, and it is associated with the free end 28 of a pin 27 of a guide and lateral force take-up element 19 of the other endless drive device 15b, 15a via an oblong slot having its main axis extending in the suspension direction, and through which said pin 27 passes without the upright bearing on it.

In the embodiment of the invention shown in the figures, the skid platform 1 comprises two longitudinal runners 30 interconnected by crosspieces, and at least four C-shaped receptacles 11 disposed substantially in the vicinity of the longitudinal ends of the longitudinal runners 30, the receptacles 11 disposed at the front of the skid platform 1 having the openings of their C-shapes facing towards the front of the skid platform 1, and the receptacles disposed at the rear of the skid platform 1 having the openings of their C-shapes facing towards the back of the skid platform 1, a hanger 6 of the overhead transporter 2 being spaced apart from the preceding hanger 6 and from the following hanger 6 by a distance substantially equal to the distance between the two receptacles 11 on a longitudinal runner 30 of the skid platform 1.

The loading prongs 26 of the hangers 6 are long enough to co-operate with both of the front receptacles, or with both of the rear receptacles.

In the loaded position, the loading prong 26 of each hanger 6 and the respective loading receptacles 11 of the skid platform 1 constitute a link pivoting about an axis extending in the lateral direction 8.

Furthermore, the loading prongs 26 of the hangers 6 and the loading receptacles 11 of the skid platform 1 constitute links offering improved safety.

The loading prongs 26 can pivot about the uprights 25 so as to maintain the loading prongs 26 mutually parallel and in alignment with the receptacles in the skid platform 1 while it is being transported around a curve. Thus the conveying path 3 can include changes in conveying direction 4 corresponding to curves lying in a plane perpendicular to the suspension direction 7.

In the embodiment shown in the figures, the front loading prong 26 can pivot rearwards and the rear loading prong 26 can pivot frontwards. Each of the receptacles includes an abutment 40 such that, when the skid platform 1 goes into a curve, the front loading prong 26 comes into contact with the abutments 40 of the front receptacles 11 and is constrained to pivot rearwards, and the rear loading prong 26 comes into contact with the abutments of the rear receptacles 11 and is constrained to pivot frontwards, the front and rear loading prongs thus retaining an excellent position for supporting the transported skid platform 1.

The conveyor operates as follows.

A front hanger 6 goes from the return run 14 to the conveying run 13 by being pivotally displaced.

The skid platforms 1 to be loaded are brought to the start of the conveying path 3 by a lower handling device of the roller or chain type (not shown). Displacement of the skid platform 1 is synchronized with the speed of advance of the hangers 6, so that the front receptacles 11 are engaged around the loading prong 26 of the front hanger 6 once the front hanger is on the conveying run 13.

The skid platform 1 is then displaced on the handling device at the speed of advance of the hangers 6.

A rear hanger 6 then goes from the return run 14 to the conveying run 13 by being pivotally displaced and engages in the rear receptacles 11. This results from the fact that the spacing between two hangers 6 on the overhead transporter 2 corresponds to the spacing between the front and rear receptacles 11 on the skid platform.

The skid platform 1 is then supported both at the front and at the rear so that it can be taken off the lower handling device.

On encountering a change in level, the hangers 6 remain vertical and mutually parallel, and the skid platform 1 gradually adopts the slope of the change in level by the receptacles 11 pivoting about the loading prongs 26 of the hangers 6.

On encountering a downward change in level, the front receptacles 11 abut against the loading prong 26 of the front hanger 6, thereby retaining the frontwardly sloping skid platform 1.

On encountering an upward change in level, the rear receptacles 11 abut against the loading prong 26 of the rear hanger 6, thereby pulling the rearwardly sloping skid platform 1.

On encountering a curve, the front and rear loading prongs 26 pivot so as to remain mutually parallel and in alignment with the receptacles of the skid platform 1 throughout the curve. They are constrained to pivot when they come into contact with the abutments 40 in the receptacles 11.

At the end of the conveying path, a lower handling device supports the skid platform 1 again, the front hanger 6 arriving at the end of the conveying path 3 is pivotally displaced about the end wheels of the endless drive devices 15a, 15b, and it is released from the front receptacles 11 on the skid platform 1.

The skid platform 1 is then removed downstream from the conveying path 3 either at a speed that is higher than the speed of the hangers 6, or pushed by the rear hanger 6 until said rear hanger is pivotally displaced.

The hangers 6 then travel empty along the return run 14 until the start of the conveying path 3, whereupon they take on board another skid platform 1 as described above.

Since the conveyor includes only one overhead transporter situated along the conveying path 3, since the hangers 6 can accommodate the curves, and since the skid platforms 1 are cantilevered out, the conveying path may take many configurations. Such a conveyor can accommodate changes in level and curves.

In particular, such a conveyor offers twice the working length of a conveyor having two overhead transporters by making it possible to transform the return run for the empty hangers into a conveying run 13, with the return run 14 then being made as short as possible.

An auxiliary overhead transporter may be provided situated facing a portion of the conveyor, and equipped with L-shaped hangers for applying a voltage to the transported object in electrophoresis stages. The auxiliary transporter does not support the skid platform.

Naturally, the invention is not limited to the embodiment described and shown, but rather numerous variants accessible to a person skilled in the art can be made without going beyond the invention. In particular, without going beyond the ambit of the invention, any means may be replaced by equivalent means.

We claim:

1. A conveyor for conveying detachable skid platforms, the conveyor comprising a conveying path defining a conveying direction, endless drive means, and hangers associated with the endless drive means, and defining a suspension direction and a lateral direction that is perpendicular to the plane defined by the suspension direction and by the conveying direction, each of said hangers having a free end comprising loading means designed to co-operate with complementary loading means on a detachable skid platform supporting an object to be conveyed;

wherein all of the hangers are associated with the endless drive means of a single overhead transporter; and wherein the endless drive means of the overhead transporter comprise at least two endless drive devices that are identical, parallel, and superposed in the suspension direction, and that are synchronized with each other, each hanger being driven by both of the two identical and superposed endless drive devices.

2. A conveyor according to claim 1, wherein each of the hangers is generally L-shaped, comprising an upright portion extending substantially in the suspension direction, and a loading prong extending substantially in the lateral direction towards the conveying path, the loading means of the hanger comprising said loading prong, and the complementary loading means on the detachable skid platform comprising at least one receptacle for receiving the loading prong.

3. A conveyor according to claim 1, wherein, when a hanger is associated with detachable skid platform, the loading means of the hanger, and the complementary loading means on the detachable skid platform constitute a link pivoting about an axis extending in the lateral direction.

4. A conveyor according to claim 1, wherein, when a hanger is associated with the detachable skid platform, the loading means of the hanger and the complementary loading means of the detachable skid platform constitute a link offering improved safety.

5. A conveyor according to claim 2, wherein the detachable skid platform comprises two longitudinal runners interconnected by crosspieces, and at least four C-shaped receptacles, each of which is disposed substantially in the vicinity of a respective longitudinal end of a respective longitudinal runner, the receptacles disposed at the front of the detachable skid platform having the openings of their C-shapes facing towards the front of the skid platform, the receptacles disposed at the rear of the detachable skid platform having the openings of their C-shapes facing towards the rear of the detachable skid platform, a hanger being spaced apart from the preceding hanger and from the following hanger by a distance substantially equal to the distance between the two receptacles on a longitudinal runner of the detachable skid platform, the front receptacles being associated with the loading prong of a front hanger, and the rear receptacles being associated with the loading prong of a rear hanger.

6. A conveyor according to claim 1, wherein the conveying path includes at least one change in conveying direction corresponding to a curve lying in a plane perpendicular to the suspension direction.

7. A conveyor according to claim 1, wherein, each endless drive device comprises an endless chain or the like, a plurality of chain support elements driven by the endless chain or the like and mounted on a chain support and guide rail, and a plurality of lateral force take-up elements driven by the endless chain or the like and mounted in a guide and lateral force take-up rail, each of said hangers being driven via at least first and second guide and lateral force take-up elements belonging to respective ones of the endless drive devices.

8. A conveyor according to claim 7, wherein each of the Guide and lateral force take-up elements driving a hanger is secured directly to at least one chain support element.

9. A conveyor according to claim 7, wherein the hangers are prevented from moving relative to the guide and lateral force take-up elements both in the lateral direction and in the conveying direction, and they are mounted to rotate about respective axes extending in the lateral direction relative to the guide and lateral force take-up elements.

10. A conveyor according to claim 7, wherein at least some of the hangers are suspended from the guide and lateral force take-up elements of one of the two identical superposed endless drive devices only, and at least some of the other hangers are suspended from the guide and lateral force take-up elements of the other one of the two identical superposed endless drive devices only.

11. A conveyor according to claim 7, wherein the chain support elements are trolleys running on the guide and suspension rail, and they are mounted to move in translation with the chain or the like in the conveying direction, and wherein the guide and lateral force take-up rail is a rail that is generally channel-section, each of the guide and lateral force take-up elements including two wheels having axes of rotation perpendicular to the web of the channel section, and disposed in the channel section, each of said wheels being mounted at a respective one of the ends of a longitudinal beam element, said beam element including centered association means for association with a hanger, each end of the beam element being secured directly to a trolley.

12. A conveyor according to claim 10, wherein said centered association means for association with a hanger comprise a pin extending in the lateral direction and mounted substantially at the center of the beam element, the pin including a free end, said upright of each hanger extending in the suspension general direction, being suspended from and driven via the free end of the pin extending in the lateral direction of one of the guide and lateral force take-up elements of one of the two endless drive devices, and merely driven via the free end of the pin extending in the lateral direction of one of the guide and lateral force take-up elements of the other endless drive device.

13. A conveyor according to claim 6, wherein the loading prongs are mounted to pivot about the uprights so as to maintain the loading prongs mutually parallel and in alignment with the receptacles in the skid platform while it is being transported around a curve.

14. A conveyor according to claim 13, wherein the front loading prong can pivot rearwards, and the rear loading prong can pivot frontwards, each receptacle including an abutment so that when the skid platform goes into a curve, the front loading prong coming into contact with the abutments of the front receptacles pivots rearwards, and the rear loading prong coming into contact with the abutments of the rear receptacles pivots frontwards, the front and rear loading prongs thus being retained in an excellent position to support the transported skid platform.

* * * * *